United States Patent
Prakash et al.

(10) Patent No.: US 8,750,491 B2
(45) Date of Patent: Jun. 10, 2014

(54) MITIGATION OF ECHO IN VOICE COMMUNICATION USING ECHO DETECTION AND ADAPTIVE NON-LINEAR PROCESSOR

(75) Inventors: Vinod Prakash, Redmond, WA (US); Chao He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 12/409,520

(22) Filed: Mar. 24, 2009

(65) Prior Publication Data

US 2010/0246804 A1  Sep. 30, 2010

(51) Int. Cl.
*H04M 9/08* (2006.01)
*H04M 3/00* (2006.01)

(52) U.S. Cl.
CPC .................................... *H04M 3/002* (2013.01)
USPC ............. 379/406.05; 379/406.07; 379/406.14

(58) Field of Classification Search
CPC ...................................................... H04M 3/002
USPC .............. 379/406.08, 406.05, 406.07, 406.14
See application file for complete search history.

(56) References Cited

U.S. PATENT DOCUMENTS

| | | | |
|---|---|---|---|
| 4,823,382 A * | 4/1989 | Martinez | 379/406.08 |
| 5,274,705 A | 12/1993 | Younce et al. | |
| 5,774,561 A * | 6/1998 | Nakagawa et al. | 381/66 |
| 6,125,179 A | 9/2000 | Wu | |
| 6,424,635 B1 | 7/2002 | Song | |
| 6,507,653 B1 | 1/2003 | Romesburg | |
| 6,574,336 B1 | 6/2003 | Kirla | |
| 2002/0101982 A1 | 8/2002 | Elabd | |
| 2004/0037417 A1* | 2/2004 | Seibert | 379/406.01 |
| 2008/0181392 A1* | 7/2008 | Zad-Issa | 379/406.08 |
| 2008/0247535 A1 | 10/2008 | Li et al. | |
| 2008/0247536 A1* | 10/2008 | Rahbar | 379/406.08 |

OTHER PUBLICATIONS

"G.168 Echo Canceller by Adaptive Digital", retrieved at <<http://www.adaptivedigital.com/product/echo_cancel/g168_echo_canceller.htm>>, Jan. 24, 2009.

"dsPIC DSC Acoustic Echo Cancellation Library User's Guide", retrieved at <<http://ww1.microchip.com/downloads/en/DeviceDoc/70134D.pdf>>, Microchip Technology Inc., 2008.

"Adaptive Audio Specialist", retrieved at <<http://70.91.220.161/files/AEC%20Paper.pdf>>.

* cited by examiner

*Primary Examiner* — Alexander Jamal
(74) *Attorney, Agent, or Firm* — Jim Ross; Leonard Smith; Micky Minhas (57) ABSTRACT

Architecture that mitigates echo in voice communications using echo detection and adaptive management of attenuation by a non-linear processor (NLP). Suppression values provided by the NLP are determined based on echo detection and retained on a case-by-case basis to automatically increase or decrease the attenuation as needed. Feedback is incorporated that where the controls for the NLP attenuation is given by the amount of echo that remains, and this in turn affects the amount of echo that remains.

20 Claims, 9 Drawing Sheets

MITIGATION OF ECHO IN VOICE COMMUNICATION USING ECHO DETECTION AND ADAPTIVE NON-LINEAR PROCESSOR

BACKGROUND

In a point-to-point or multiple point full-duplex voice communications, if acoustic coupling exists between the receive path (e.g., a speaker) and send path (e.g., microphone) of an endpoint, echo of the talker at the far-end will be present in the microphone at the near-end. An acoustic echo canceller (AEC) is a signal processing technology used to remove this echo. The core of an AEC utilizes adaptive filters that attempt to predict and cancel this echo by modeling the acoustic echo path between the speaker and the microphone. Oftentimes, the echo that remains after the operation of these adaptive filters and other associated echo reduction modules is audible, and additional suppression techniques are needed to remove this residual echo.

A non-linear processor (NLP), also known as a microphone fading routine, is one such technique where the signal at the microphone is attenuated by an amount proportional to the strength of the signal at the speaker. In order to balance the tradeoff between suppressing residual echo and maintaining full-duplex behavior for the conversation, a conservative setting for the maximum NLP attenuation is used. This is because the signal captured at the microphone also contains speech from the local talker, and in cases where both the remote and local party are active, a strong NLP can distort the speech sent from the local talker's end.

This conservative setting for NLP attenuation is inadequate for situations that commonly occur, that of an echo path change. Since the adaptive filters do not provide sufficient cancellation, a higher-than-normal suppression is desired from the NLP to remove the echo. Additionally, having a fixed maximum attenuation for the NLP that is set to satisfy broad categories of devices and scenarios is inadequate in suppressing echo for specific cases, where there is strong acoustic coupling between the speaker and microphone, for example.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture mitigates echo in voice communications using echo detection and adaptive management of attenuation by a non-linear processor (NLP). Suppression values provided by the NLP are determined based on echo detection and retained on a case-by-case basis to automatically increase or decrease the attenuation as needed. Feedback is incorporated that where the controls for the NLP attenuation is given by the amount of echo that remains, and this in turn affects the amount of echo that remains.

The architecture operates in at least two stages. In one implementation, operation is in the sub-band domain as follows: in the first stage, multiple independent short length adaptive filters search for echo presence after all the echo reduction components of the acoustic echo cancellation (AEC), across a range of sub-bands and maximum expected echo delay values. These adaptive filters attempt to predict and cancel any echo that may remain based on the content in the speaker signal. Due to the adaptive nature of the search and that multiple filters are used, the method is robust to a wide variety of distortions. In the event significant cancellation is achieved in any of the sub-band filters, it is determined that echo is present after current echo reduction processing. In the second stage, the maximum attenuation of the NLP is adaptively changed based on the echo detection results from the first stage. This way the NLP attenuation automatically adjusts to the requirements.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Acoustic echo cancellation (AEC) is a digital signal processing technology used to remove the echo from a speaker phone in two-way or multi-way communication system such as in traditional telephone or modern Internet audio conversation applications such as for voice-over-IP (VoIP).

In a typical two-way communications system, the far-end voice is played to the near-end user through a loud speaker (or some other audio output device). A portion of the far-end voice is captured by the microphone in the near-end system, processed through the system, and then sent back to the far end. Thus, the far-end user will hear his voice with a certain delay, which is how echo forms. To distinguish from line/network echo that is caused by impedance mismatch, the echo referred to herein is called acoustic echo.

The echo echo(t) in a two-way system can be modeled as a speaker signal convolved by a room response, which is also referred to as echo path. The echo path includes the effects of delays and phase changes caused by the slow speed of sound wave propagation through air and other materials. The echo path also includes multiple reflections of the sound wave off walls or other surfaces. The echo can be computed as follows:

$$\text{echo}(t) = spk(t) * g(t) = \int_0^{T_e} g(\tau) \cdot spk(t-\tau) d\tau$$

where g(t) is room response, and $T_e$ is echo length that depends on size of the room and material of the reflection surfaces.

The problem of echo cancellation is to find the room response, calculate echoes, and subtract echoes from the microphone signals. However, echo path is highly variable, so the filter g(t) cannot be fixed and cannot be calculated beforehand.

A non-linear processor (NLP) is one such technique where the signal at the microphone is attenuated by an amount proportional to the strength of the signal at the speaker. The purpose of the NLP is to attempt removal of echo, and while doing so, find a balance between suppressing residual echo and maintaining full-duplex behavior for the conversation. In practice, fixed values are employed for how much compression the NLP module provides, which in turn, has a fixed cost on the near-end user voice. This solution may work where microphone and speaker specifications are precisely known, separation data for the microphone and speaker, and device properties, for example. However, fixed values for a general solution do not work since the near-end voice gets distorted, or is too soft, for example.

Hence, the disclosed architecture describes an adaptive NLP algorithm that controls the maximum amount of NLP attenuation that needs to be applied based on the extent of echo leak. The adaptive NLP algorithm detects echo leaks more reliably and quickly as compared to the conventional techniques used for echo cancellation.

In other words, the architecture provides echo presence detection after processing through all echo reduction components in the AEC, uses an echo reduction component in the form of the adaptive NLP algorithm to mitigate echo leak.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
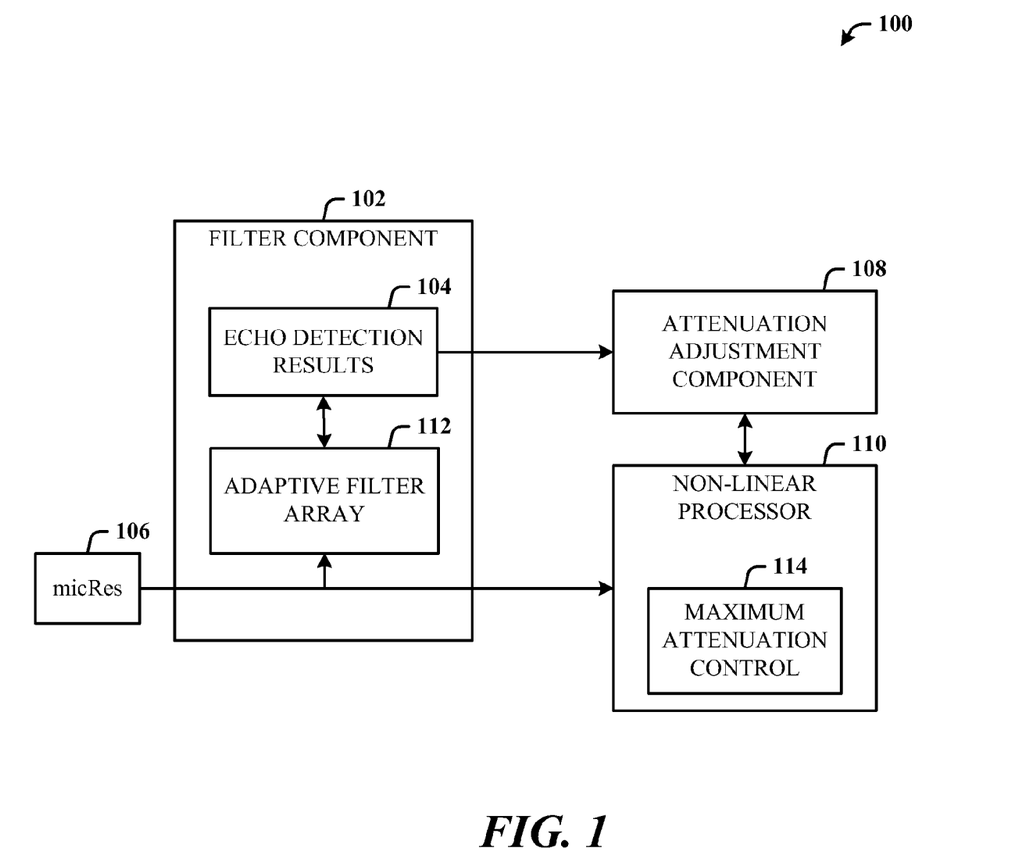
FIG. 1 illustrates computer-implemented echo mitigation system in accordance with the disclosed architecture.

FIG. 1 illustrates computer-implemented echo mitigation system 100 in accordance with the disclosed architecture. The system 100 comprises a filter component 102 for computing echo detection results 104 based on searching for echo in a residual microphone signal (micRes) 106 relative to content in a speaker signal. The system 100 also includes an attenuation adjustment component 108 for adaptively adjusting attenuation in a non-linear processor (NLP) 110 based on the echo detection results 104.

Additional aspects and description are provided herein below, and include the following. The filter component 102 and the attenuation adjustment component 108 are part of a two-way voice communications system that processes voice signals between a near-end user and a far-end user. The filter component 102 utilizes an array 112 of adaptive filters (e.g., short length adaptive filters) to search for echo in a residual microphone signal that is output after echo reduction processing. The filter component 102 searches cross a range of subbands and maximum expected echo delay values to cancel echo in the microphone signal based on the content in the speaker signal.

The attenuation adjustment component 108 adaptively decreases a maximum attenuation in the NLP via a maximum attenuation control 114 in response to an absence of strong echo as indicated in the echo detection results 104, and adaptively increases a maximum attenuation in the NLP via the maximum attenuation control 114 in response to a presence of strong echo as indicated in the echo detection results 104.

The filter component 102 determines that echo is present in a residual microphone signal based on cancellation of the echo by the filter array 112 (e.g., an array of independent short length adaptive filters). The filter component 102 computes that the echo is strong echo based on a signal-to-noise ratio (SNR) value of a final signal transmitted to a far end relative to an SNR threshold.

Put another way, a computer-implemented echo processing system 100 can be part of a two-way voice communications system. The echo processing system 100 includes the filter component 102 for searching for echo in the residual microphone signal 106 using the adaptive filter array 112 of short length adaptive filters, and the attenuation adjustment component 108 for adaptively adjusting maximum attenuation in the NLP 110 based on results of the search. The maximum attenuation in the NLP 110 is adaptively adjusted using the maximum attenuation control 114.

The filter component 102 searches cross a range of subbands and maximum expected echo delay values to cancel echo in the residual microphone signal 106 based on content in the speaker signal. The attenuation adjustment component 108 adaptively decreases a maximum attenuation in the NLP 110 in response to an absence of echo and adaptively increases the maximum attenuation in response to a presence of echo.

The filter component 102 predicts correlation between the residual microphone signal 106 and a speaker signal in a sub-band domain by using past samples of the speaker signal over a causal-delay search range and an acausal-delay search range. The filter component 102 computes a measure of prediction ability based on echo return loss enhancement (ERLE) of delay indices, a maximum of the ERLE for all the indices is applied against a threshold to determine if the echo exists in the residual microphone signal 106. The filter component 102 computes that the echo is strong echo based on the SNR value, the SNR value computed based on the ratio between the final signal transmitted to the far end and the noise level transmitted to the far end, and the SNR value relative to an SNR threshold.

Figure 2:
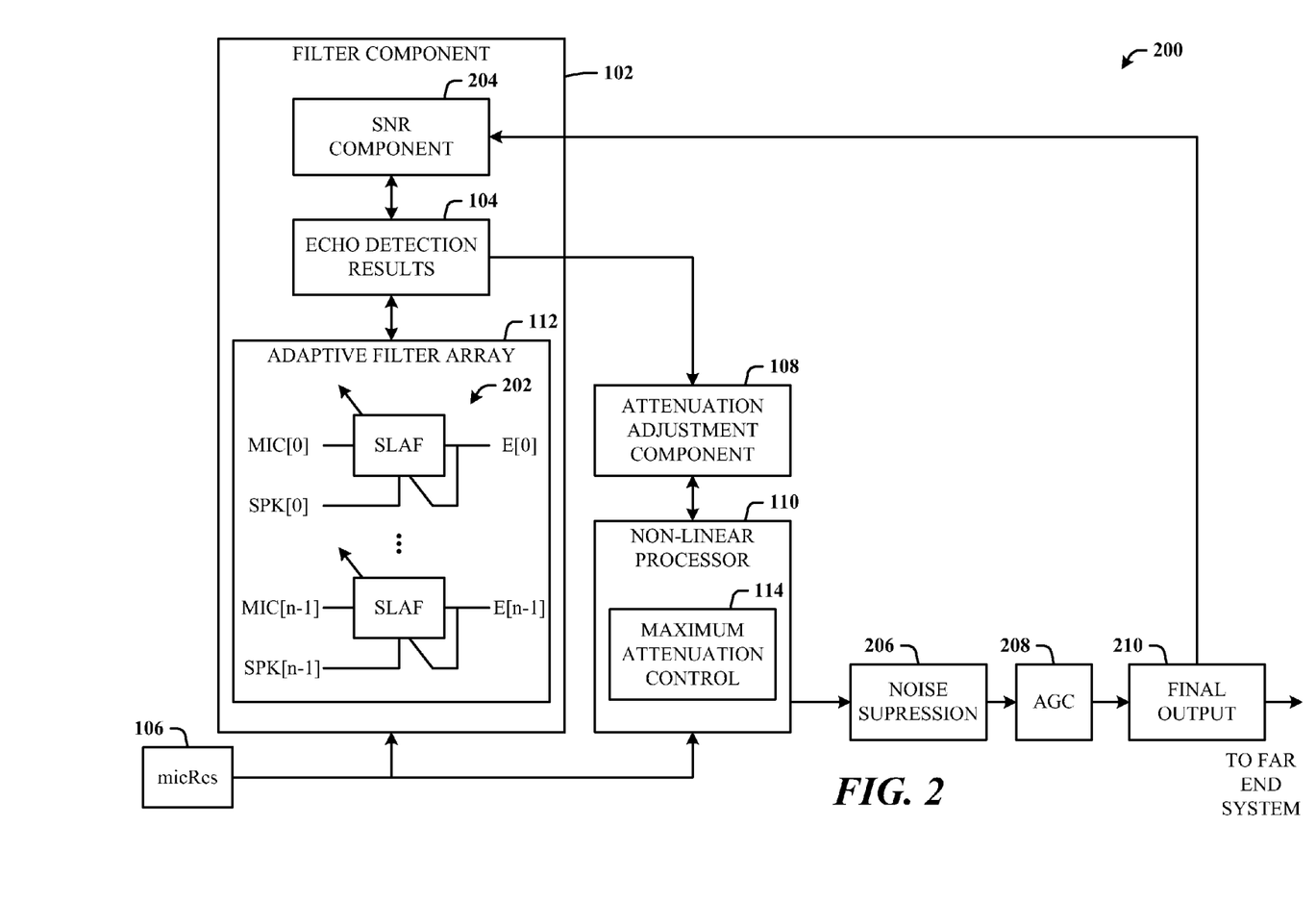
FIG. 2 illustrates details of the adaptive filter array in searching for echo in the residual microphone signal.

FIG. 2 illustrates details of an echo mitigation system 200 that employs the adaptive filter array 112 in searching for echo in the residual microphone signal 106. The filter component 102 includes the adaptive filter array 112 having short length adaptive filters (SLAFs) 202. An adaptive algorithm is used to adaptively find the optimum filter g(t) that matches echo path. Here, the filter component 102 is depicted as including an SNR component 204 for computing the SNR values. Additionally, the system 200 includes noise suppression 206 and automatic gain control (AGC) 208 of the output of the NLP 110, before the final output 210 is sent to the far end system, and also fed back to the SNR component 204. Note that it is possible to have echo detection follow the NLP 110 as an adaptive NLP control, as well.

In the sub-band approach, the microphone input signal is first passed through a bank of analysis filters $h_0, h_1, h_2, \ldots,$ $h_{K-1}$ and produces vectors of K sub-band signals; then, AEC is performed in each sub-band. At the end, the resultant sub-band error signals are passed through a bank of synthesis filters, and yield a full-band signal. In each sub-band, because signal bandwidth is reduced, the sampling rate can be reduced by a factor of M (decimation). For improved stop-band rejection, M is less than the number of bands K.

Two advantages of the sub-band approach include a reduction in computational complexity because of the downsampling, and improved convergence rate because the sub-band signal spectra are more nearly uniform than the full-band signal. Therefore, the sub-band approach is used widely in acoustic echo cancellation applications.

The speaker (spk) and microphone (mic) sub-band signals after timestamp based alignment are denoted as spk[n, k], mic[n, k] respectively, where n is the time (frame) index for sub-band processing, and k is the sub-band frequency (k=0, 1, ... M-1).

Non-linear processing is an echo reduction technique that follows all other echo reduction techniques. Non-linear processing is used to remove any residual echo that remains, and in practice is employed in most cases, since in typical operating environments the residual echo is sufficiently perceptible.

The NLP 110 operates to attenuate the microphone signal whenever there is strong signal activity on the speaker, the amount of attenuation being dependent on the strength of the speaker signal.

This directly leads to a half-duplex-like nature of communication (the NLP 110 behaving as a gentle microphone-mute based voice switch). The NLP 110 operates in the sub-band (or full-band) domain by attenuating the residual microphone signal (following all other echo reduction components) by applying the following gain to the residual microphone signal:

$$10^{\wedge}(-NLP\_\text{max\_attenuation}/20)*\log 10(\text{spkPow}[n,k]/\text{spkPowMin}[n,k])/\log 10(\text{spkPowMax}[n,k]/\text{spkPowMin}[n,k]),$$

where, NLP_max_attenuation is the maximum attenuation (echo reduction) provided by the NLP 110 in decibels (dB); spkPow[n, k] is the power in the corresponding sub-band of the speaker (possibly averaged over some frames); and, spkPowMin[n, k] and spkPowMax[n, k] track respectively the minimum and maximum values of spkPow[n,k] in short term history (these can be set to fixed values).

In case spkPow[n, k]<spkPowMin[n, k], no attenuation is applied by the NLP 110. In case spkPow[n, k]>spkPowMax[n, k], NLP_max_attenuation dB of attenuation is provided by the NLP 110 for the sub-band 'k' in the frame 'n' in the microphone signal (after all other echo reduction techniques).

With respect to detecting presence of echo in the sub-band domain, filter component attempts to predict any correlation between the speaker signal and the microphone signal after passing through all other echo reduction components (the adaptive filter described previously being one such component) except NLP, using SLAFs (e.g., hereafter fixed to be of length 3).

Since the true physical delay between the timestamp adjusted speaker and microphone sub-band samples can be positive or negative, a search for this delay is performed by using the speaker signal delayed in either direction. The microphone signal, after passing through all previous echo reduction components, is referred to as the microphone residual signal (micRes[n, k] in the sub-band domain). The procedure is:

Predict micRes[n, k] using past samples of the speaker signals {spk[n−d, k], spk[n−d−1, k], spk[n−d−2, k]} as micRes[n,k, d], where d=0, 1, 2, . . . L0, and L0 is the causal-delay search range.

Predict micRes[n, k] using {spk[n+d, k], spk[n+d−1, k], spk[n+d−2, k]} as micRes[n,k, −d], where d=1, 2, . . . L1, and L1 is the acausal-delay search range.

As a measure of the prediction ability, the following quantity (expanded as echo return loss enhancement (ERLE)) is computed (illustrated only for the causal-delay case, the computation for the acausal case is similar):

$$\text{ERLE}(d,k)=\text{var}(\text{micRes}[n,k])/\text{var}(\text{micRes}[n,k]-\text{micRes}[n,k,d])$$

where the variance var( ) is computed using recursive averaging over time, and micRes[n, k, d] is the predicted micRes [n, k] by the adaptive filter using {spk[n−d, k], spk[n−d−1, k], spk[n−d−2, k]}

Furthermore, for a given delay index d, the representative ERLE is computed as ERLE(d)=$\max_k$(ERLE(d, k)), where k ranges over the sub-bands considered. ERLE(d) is then averaged over time to smooth out statistical variations.

In order to determine if there is any echo in the residual microphone signal, an overall ERLE value is calculated as the maximum of all ERLE(d) (considering both causal and acausal delay values). If this value exceeds a threshold (e.g., 3 dB), echo is declared to be present in the residual microphone signal; otherwise, the decision is that there is no echo present over the range of delay values considered. Furthermore, strong echo is declared to be present if echo is detected according to the above described criteria and the SNR of the final signal that is transmitted to the far-end exceeds a threshold (e.g., 3 dB).

Figure 3:
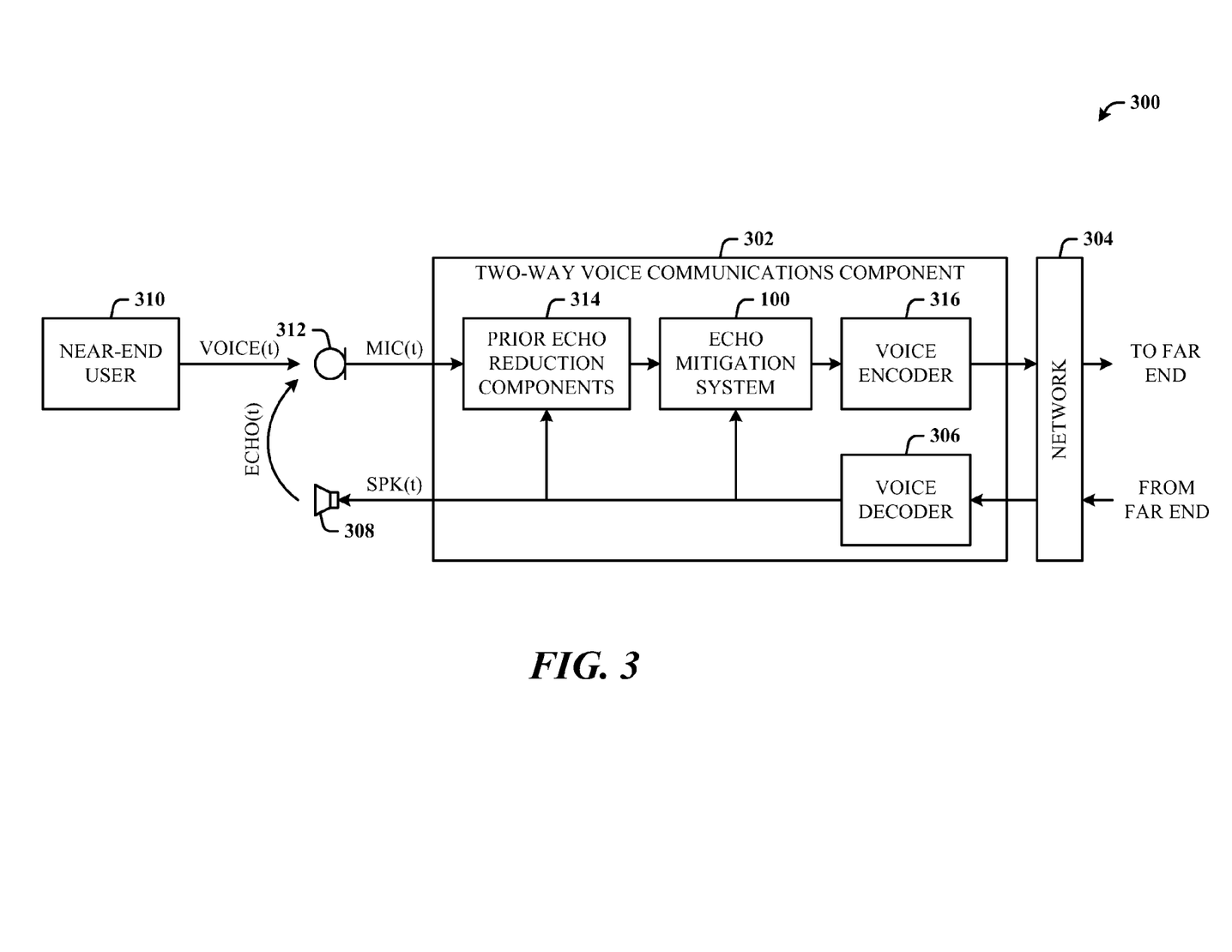
FIG. 3 illustrates a near end of a two-way voice communications system that employs the disclosed echo mitigation system as part of a two-way voice communications component.

FIG. 3 illustrates a near end 300 of a two-way voice communications system that employs the disclosed echo mitigation system 100 as part of a two-way voice communications component 302. The far end can be exactly the same. In such system, the far-end voice from the far end is received over a network 304 is decoded using a voice decoder 306 and then played through a loud speaker 308 to the near-end user 310. The far-end voice is also leaked over to (along with room response), captured by a microphone 312, and sent back to the far end through prior echo reduction components 314 (e.g., AEC), the echo mitigation system 100 as an improved echo reduction component, and a voice encoder 316. Thus, if the prior (or previous) echo reduction components 314 do not remove all echoes, the far-end user will hear his voice with a certain delay, thereby generating acoustic echo (to differentiate from line/network echo that is caused by impedance mismatch). As indicated, the echo mitigation system 100 precedes the NLP but follows all prior echo reduction components 314.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
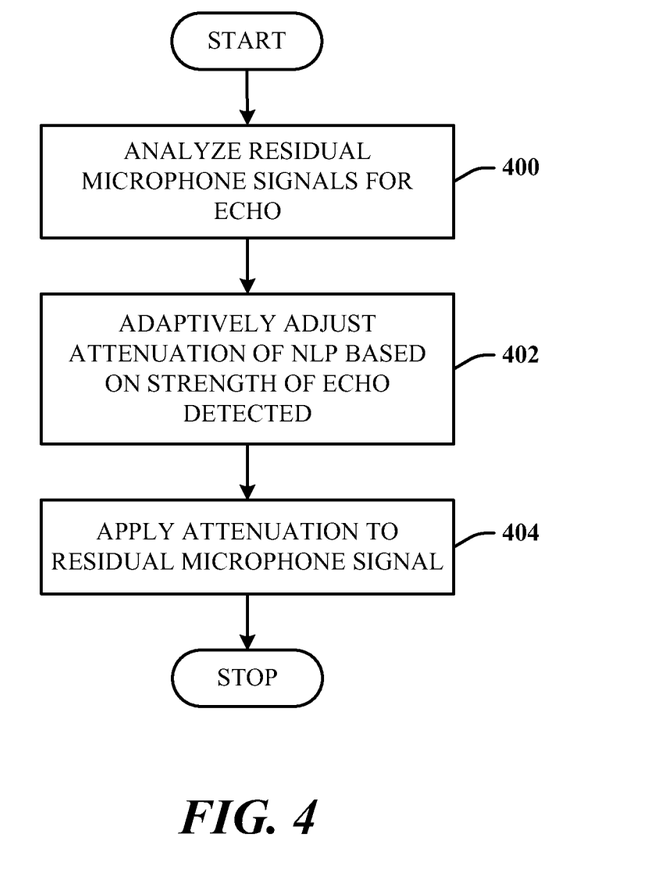
FIG. 4 illustrates a computer-implemented echo mitigation method.

FIG. 4 illustrates a computer-implemented echo mitigation method. At 400, a residual microphone signal is analyzed for echo. At 402, attenuation of an NLP is adaptively adjusted based on strength of the echo detected. At 404, the attenuation is applied to the residual microphone signal.

Figure 5:
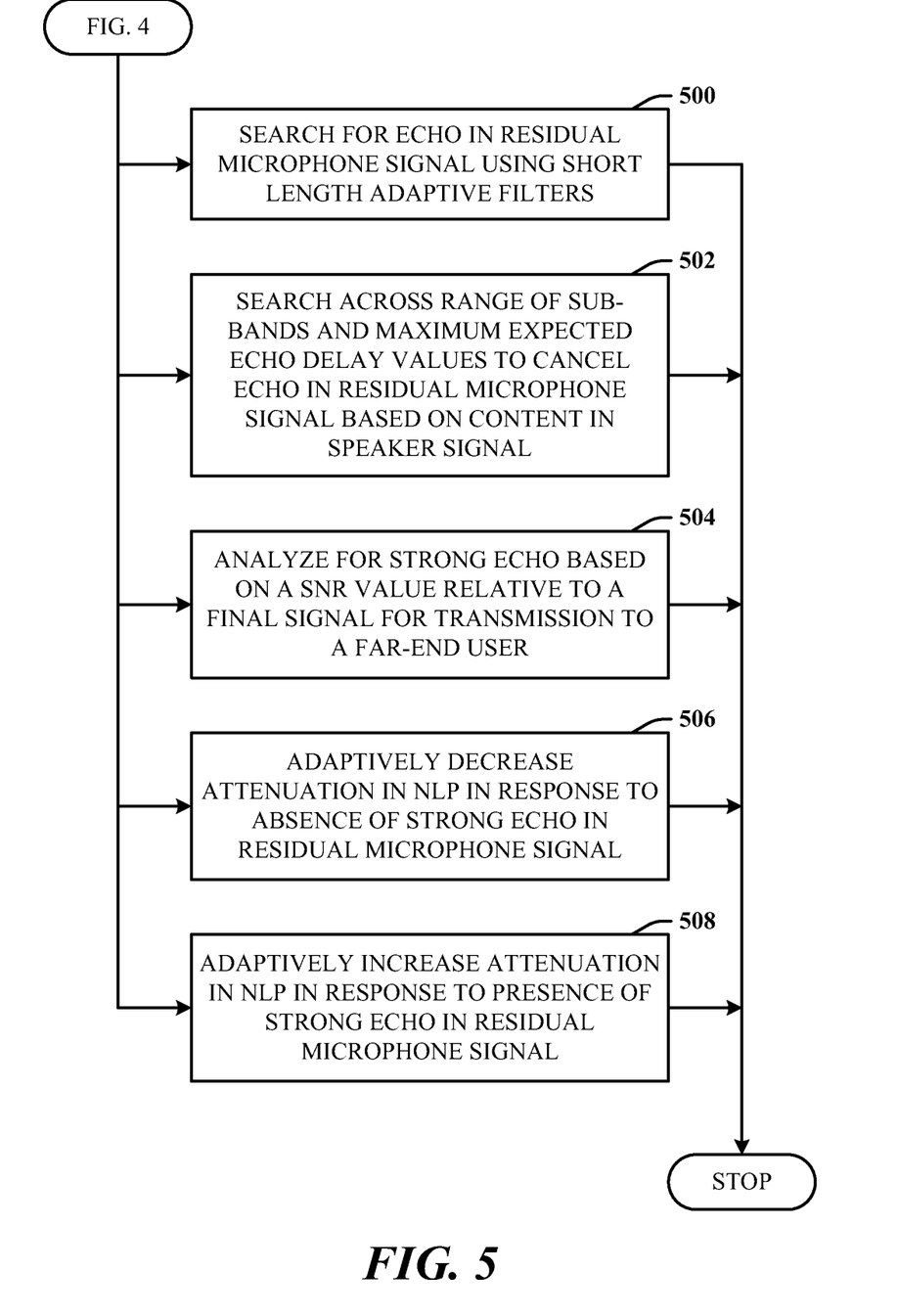
FIG. 5 illustrates additional aspects to the method of FIG. 4.

FIG. 5 illustrates additional aspects to the method of FIG. 4. At 500, echo is searched in the residual microphone signal using short length adaptive filters. At 502, searching is across a range of sub-bands and maximum expected echo delay values to cancel echo in the residual microphone signal based on the content in a speaker signal. At 504, analysis is performed for strong echo based on a SNR value relative to a final signal for transmission to a far-end user. At 506, the attenuation is adaptively decreased in the NLP in response to an absence of strong echo in the residual microphone signal. At 508, the attenuation is adaptively increased in the NLP in response to a presence of strong echo in the residual microphone signal.

Figure 6:
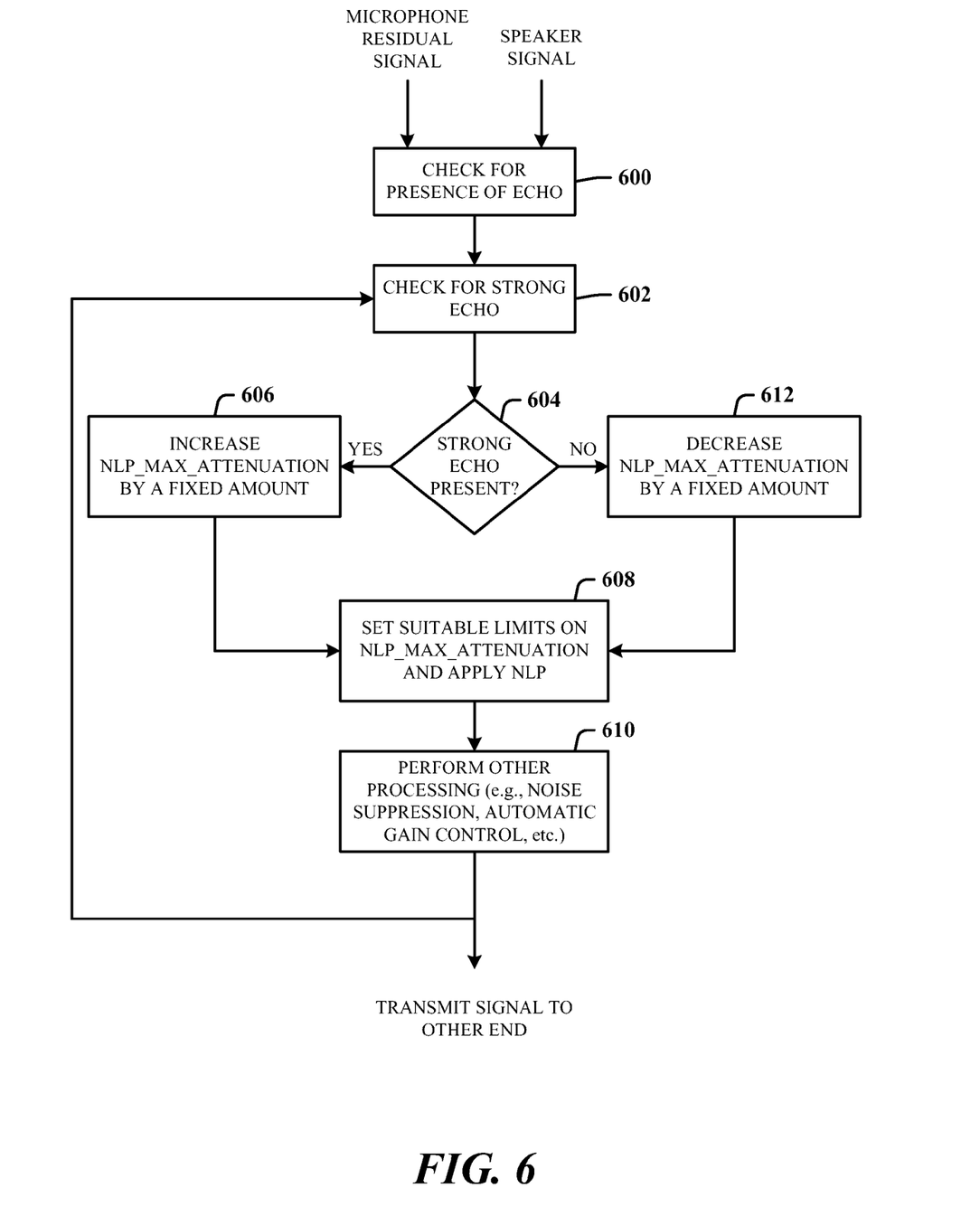
FIG. 6 illustrates a method of adaptive NLP control where the maximum attenuation provided by the NLP is modified based on the echo detected in order to mitigate overall echo leak.

FIG. 6 illustrates a method of adaptive NLP control where the maximum attenuation provided by the NLP is modified based on the echo detected in order to mitigate overall echo leak. At 600, a check for the presence of echo is performed based on the inputs of microphone residual signal and speaker signal. At 602, a further check is made as to the strength of the echo. At 604, if strong echo is present, flow is to 606 to increase the NLP maximum attenuation by a fixed amount. At 608, suitable limits are then set on the maximum NLP attenuation, and applied. At 610, other processing can be performed, such as noise suppression, AGC, and so on. Flow is then back to 602 to again check for the strength of echo. This is a continuing process during the communication. If strong echo is not detected at 604, flow is then to 612 to decrease the maximum NLP attenuation by a fixed amount. Flow is to 608 to set the suitable limits based on this decrease, and then apply the attenuation.

Figure 7:
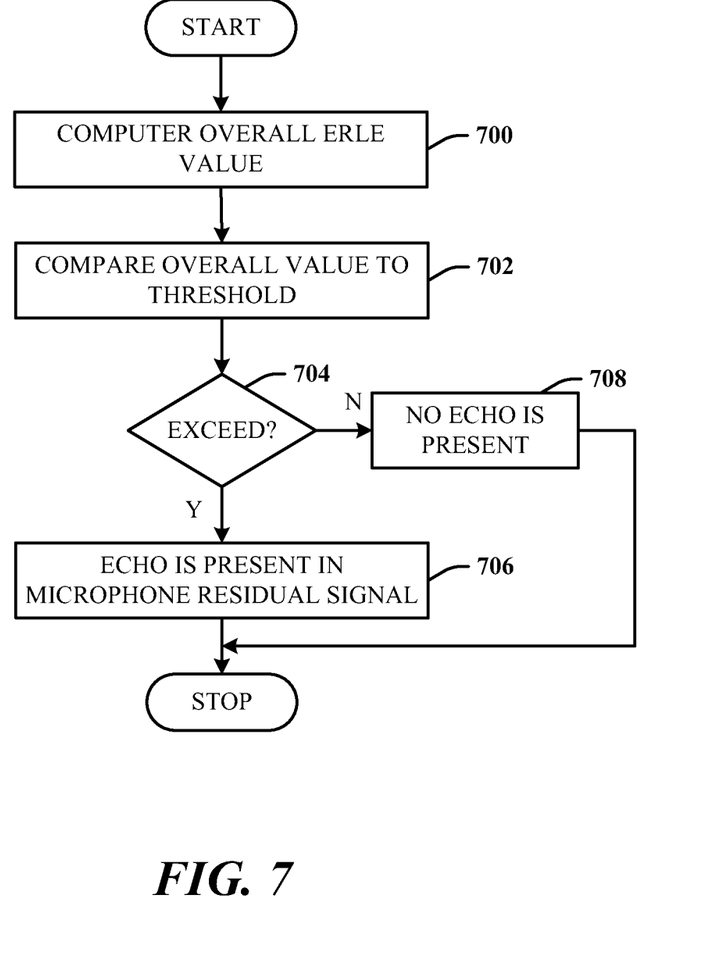
FIG. 7 illustrates a method for determining echo in a residual microphone signal.

FIG. 7 illustrates a method for determining echo in a residual microphone signal. At 700, an overall ERLE value is computed. The overall value is computed as a maximum of all ERLE of the delay indices. At 702, the overall ERLE value is compared to an ERLE threshold. At 704, if the overall value exceeds the threshold, flow is to 706 where echo is declared to be present in the residual microphone signal. On the other hand, if the overall value does not exceed the threshold, flow is from 704 to 708 where it is determined that no echo is detected.

Figure 8:
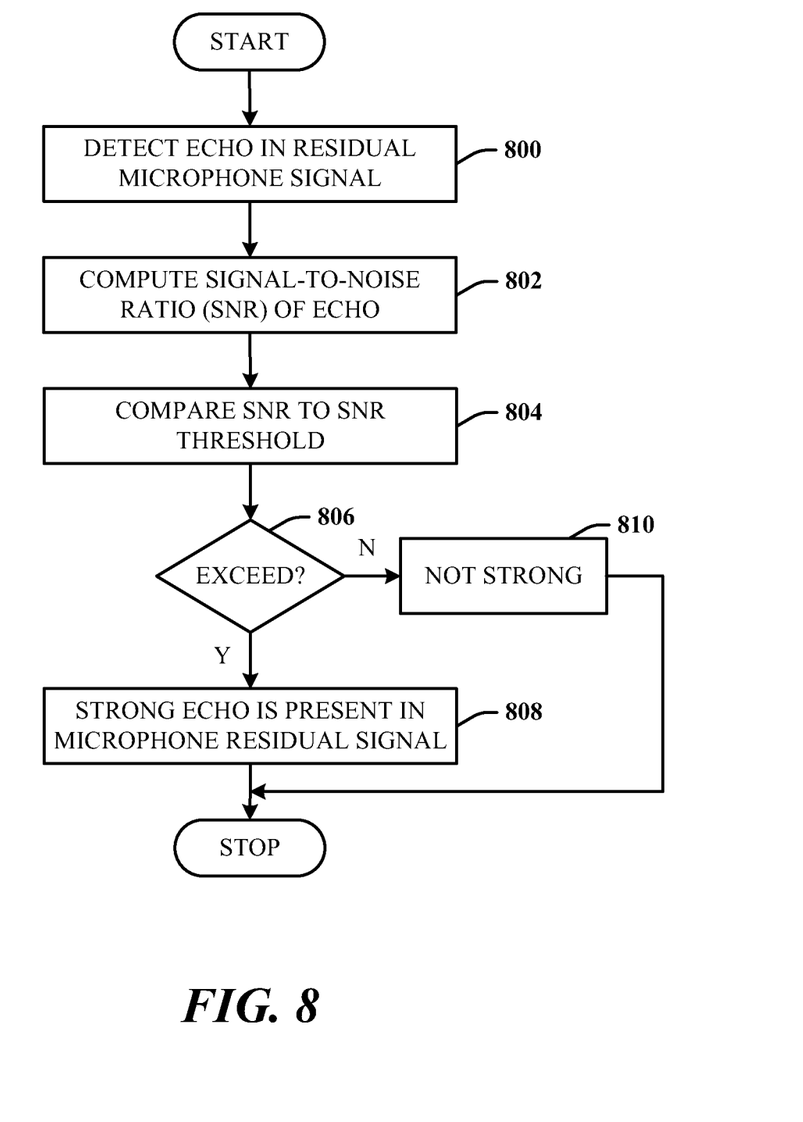
FIG. 8 illustrates a method for determining if the echo in a residual microphone is strong echo.

FIG. 8 illustrates a method for determining if the echo in a residual microphone is strong echo. At 800, echo is detected to be in the residual microphone signal. At 802, the SNR ratio is computed for the final signal send over the network to the far end. At 804, the SNR is compared against a threshold. At 806, if the SNR exceeds the threshold, flow is to 808 to determine that strong echo is present in the microphone residual signal. On the other hand, if the SNR does not exceed the threshold, flow is from 806 to 810 where the echo is considered not to be strong.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
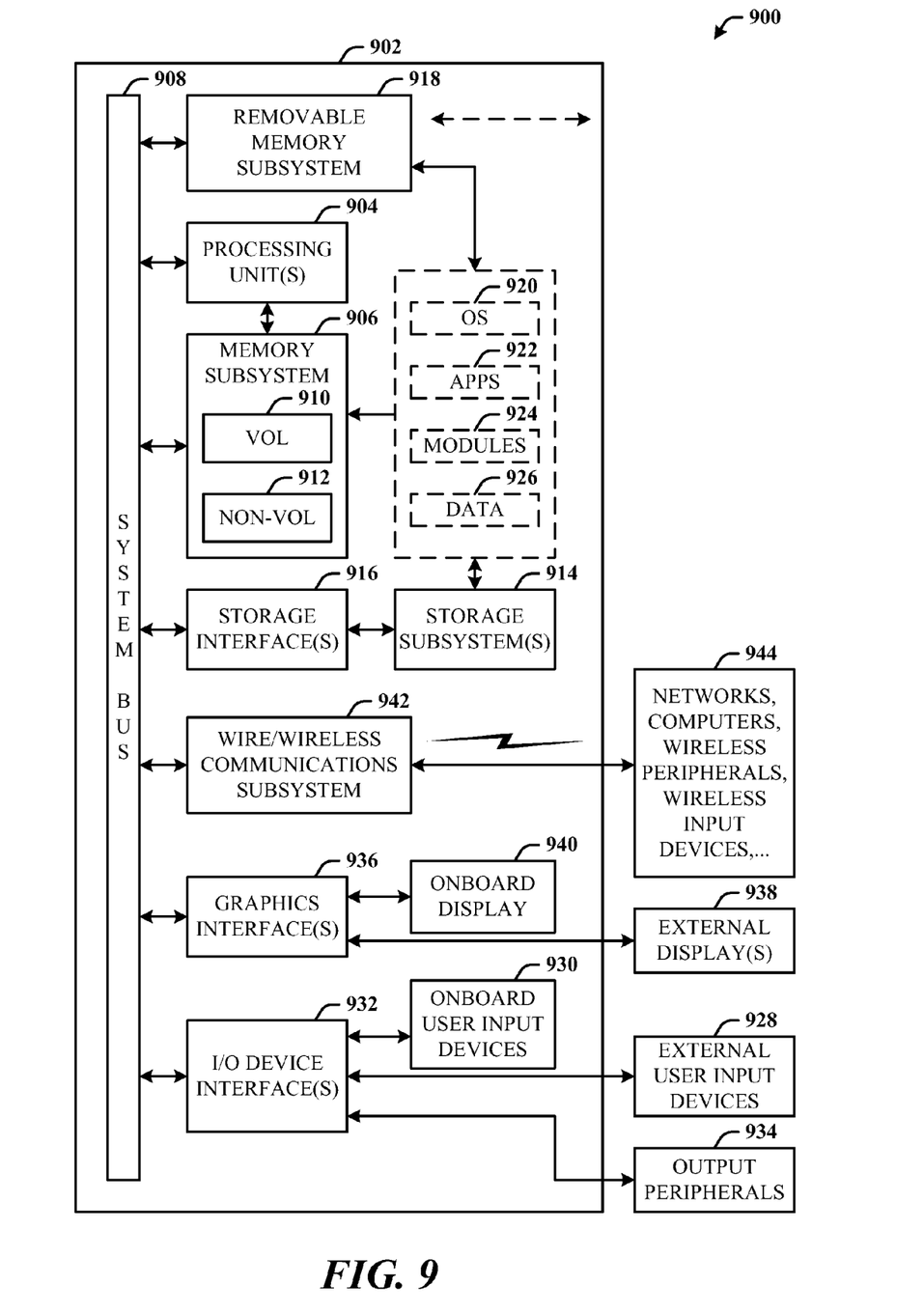
FIG. 9 illustrates a block diagram of a computing system operable to execute echo detection and adaptive NLP control in accordance with the disclosed architecture.

Referring now to FIG. 9, there is illustrated a block diagram of a computing system 900 operable to execute echo detection and adaptive NLP control in accordance with the disclosed architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the components and entities of the system 100 of FIG. 1, the SLAFs 200 of the adaptive filter array 112, components and entities of the near end 300 of FIG. 3, and the methods represented in the flow charts of FIGS. 4-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wired/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented echo mitigation system, comprising:
    a filter component configured to compute echo detection results based on searching for echo in a residual microphone signal relative to content in a speaker signal of a speaker by correlating the residual microphone signal with past samples of the speaker signal to detect variations in an echo path that correspond to echo received by the speaker;
    an attenuation adjustment component configured to adaptively adjust attenuation of an output of the filter component in a non-linear processor (NLP) based on the echo detection results; and
    a microprocessor that executes computer-executable instructions associated with at least one of the filter component or the attenuation component.

2. The system of claim 1, wherein the filter component and the attenuation component are part of a two-way voice communications system that processes voice signals between a near-end user and a far-end user.

3. The system of claim 1, wherein the filter component utilizes the array of short length adaptive filters to search for echo in a residual microphone signal that is output after previous echo reduction processing.

4. The system of claim 1, wherein the filter component searches cross a range of sub-bands and maximum expected echo delay values to cancel echo in the microphone signal based on the content in the speaker signal.

5. The system of claim 1, wherein the attenuation adjustment component adaptively decreases a maximum attenuation in the NLP in response to an absence of strong echo as indicated in the echo detection results.

6. The system of claim 1, wherein the attenuation adjustment component adaptively increases a maximum attenuation in the NLP in response to a presence of strong echo as indicated in the echo detection results.

7. The system of claim 1, wherein the filter component determines that echo is present in a residual microphone signal based on cancellation of the echo, as enabled by an array of independent short length adaptive filters.

8. The system of claim 7, wherein the filter component computes that the echo is strong echo based on a signal-to-noise ratio (SNR) value of a final signal transmitted to a far end relative to an SNR threshold.

9. A computer-implemented echo mitigation system, comprising:
a filter component of a two-way voice communications system configured to search for echo in a residual microphone signal using an adaptive filter array of short length adaptive filters that correspond to a range of frequency sub-bands and correlating the residual microphone signal with past samples of a speaker signal, to detect echo components for each respective sub-band;
an attenuation adjustment component of the two-way voice communications system configured to adaptively adjust maximum attenuation of an output of the filter component in an NLP based on results of the search; and
a microprocessor that executes computer-executable instructions associated with at least one of the filter component or the attenuation component.

10. The system of claim 9, wherein the filter component searches cross the range of sub-bands and a range of maximum expected echo delay values corresponding to the past samples to cancel echo in the residual microphone signal based on content in a speaker signal.

11. The system of claim 9, wherein the attenuation adjustment component adaptively decreases a maximum attenuation in the NLP in response to an absence of echo and adaptively increases the maximum attenuation in response to a presence of echo.

12. The system of claim 9, wherein the filter component predicts correlation between the residual microphone signal and a speaker signal in a sub-band domain by using past samples of the speaker signal over a causal-delay search range and an acausal-delay search range.

13. The system of claim 12, wherein the filter component computes a measure of prediction ability based on echo return loss enhancement (ERLE) of delay indices, a maximum of the ERLE for all the indices is applied against a threshold to determine if the echo exists in the residual microphone signal.

14. The system of claim 9, wherein the filter component computes that the echo is strong echo based on an SNR value, the SNR value computed based on final signal transmitted to a far end relative to the noise level in the signal, and the SNR value relative to an SNR threshold.

15. A computer-implemented echo mitigation method performed by a computer system executing machine-readable instructions, the method, comprising acts of:
analyzing a residual microphone signal for echo by correlating the residual microphone signal with past samples of a signal received by a speaker to detect variations in an echo path that produce audible echo received by the speaker, to determine if the echo exists in the residual microphone signal;
adaptively adjusting attenuation of an NLP based on strength of the echo detected;
applying the attenuation to the residual microphone signal; and
configuring at least one processor to perform at least one of the acts of analyzing, adjusting, or applying.

16. The method of claim 15, further comprising searching for echo in the residual microphone signal using short length adaptive filters.

17. The method of claim 15, further comprising searching across a range of sub-bands and maximum expected echo delay values to cancel echo in the residual microphone signal based on content in a speaker signal.

18. The method of claim 15, further comprising analyzing for strong echo based on a SNR value relative to a final signal for transmission to a far-end user.

19. The method of claim 15, further comprising adaptively decreasing the attenuation in the NLP in response to an absence of strong echo in the residual microphone signal.

20. The method of claim 15, further comprising adaptively increasing the attenuation in the NLP in response to a presence of strong echo in the residual microphone signal.

* * * * *